March 10, 1959 C. F. KRAMER 2,877,038
HOOD LATCH

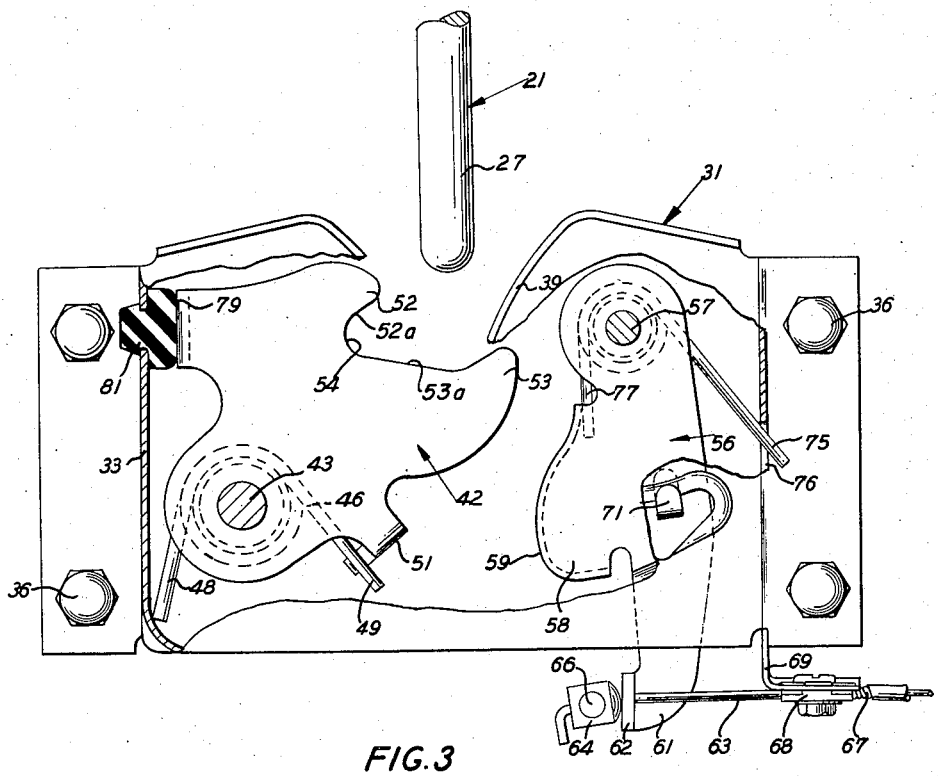

Filed June 21, 1956 3 Sheets-Sheet 3

C. F. KRAMER
INVENTOR.

BY E. C. McRae
J. R. Faulkner
J. H. Oster

ATTORNEYS

United States Patent Office 2,877,038
Patented Mar. 10, 1959

2,877,038

HOOD LATCH

Clarence F. Kramer, Birmingham, Mich., assignor to Ford Motor Company, Dearborn, Mich., a corporation of Delaware Application June 21, 1956, Serial No. 592,885

2 Claims. (Cl. 292—216)

This invention relates to hood latches for motor vehicles.

An object of the present invention is to provide a hood latch containing a minimum number of parts of relatively inexpensive construction, thus effecting economy of manufacture and assembly. A further object of the invention is to provide a hood latch which is self-centering in operation to automatically center the hood transversely of the vehicle when the hood is closed.

The hood latch of the present invention is an improvement upon that shown in the patent to C. F. Kramer 2,646,299. It comprises a mounting plate adapted to be mounted upon a fixed portion of the body structure and to integrally form a tapered guideway for centering the L-shaped striker carried by the vehicle hood. A single spring urged cam member is pivotally mounted upon the mounting plate to retain the striker in locked position and to automatically impart an initial opening movement to the striker and the hood upon the release of a trigger member, the latter also being pivotally mounted upon the mounting plate and engageable with a projecting portion of the cam member.

Other objects and advantages of this invention will be made more apparent as this description proceeds, particularly when considered in connection with the accompanying drawings, in which:

Figure 3 is a view similar to Figure 2 but illustrating the parts of the hood latch in their released positions.

Figure 4 is a horizontal cross sectional view taken on the line 4—4 of Figure 1.

Figure 1:
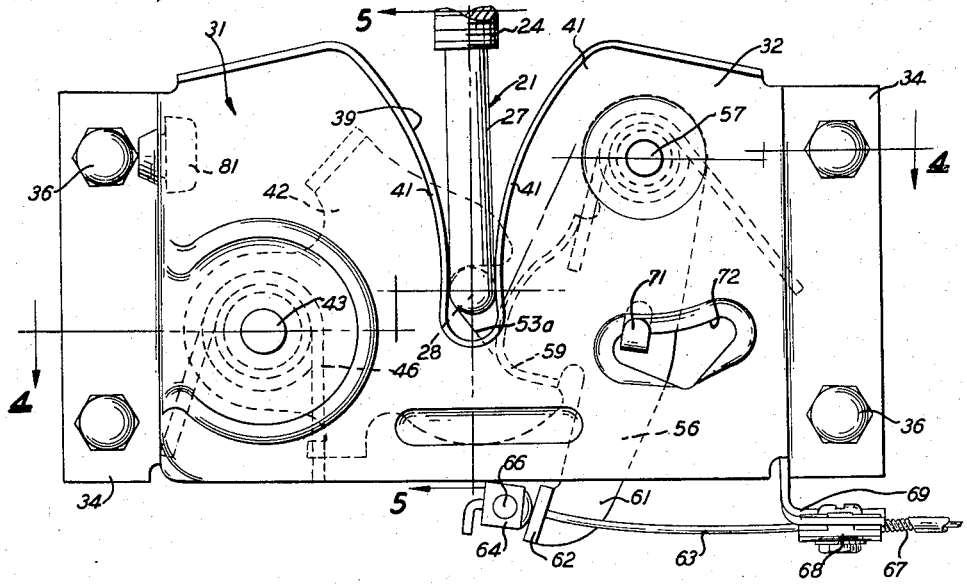
Figure 1 is an elevational view of the hood latch of the present invention.

Referring now to the drawings, the reference character 11 indicates generally the hood of a motor vehicle. The hood covers the engine compartment of the vehicle and in this instance is pivotally mounted upon a fixed structural portion of the body at the forward portion of the hood. The hood has upper and lower panels 12 and 13, and at its rearward end overlaps the adjacent cowl structure 14 of the vehicle body. The lower panel 13 of the hood engages a rubber weatherstrip 16 carried by the cowl to form a seal therewith.

Spaced forwardly from the vertical portion 17 of the cowl the hood lower panel 13 is formed with a depressed portion 18 provided with a reinforcing plate 19. A striker member 21, in the form of a headed bolt, is secured to the reinforcing plate 19 and the depressed portion 18 of the vehicle hood by means of a washer 22, lock washer 23, and nut 24, the latter being threaded upon the upper threaded portion 26 of the striker member. The shank 27 of the striker extends vertically and is integrally formed with a bent lower end portion 28 extending horizontally in a direction rearwardly of the vehicle.

A mounting bracket 31 is mounted upon the forward side of the vertical portion 17 of the cowl 14. The mounting bracket has a forward wall 32 extending parallel to the vertical portion 17 of the cowl, integral side walls 33, and outwardly projecting supporting flanges 34. The flanges 34 are positioned adjacent the portion 17 of the cowl and are secured thereto by bolts 36 extending through cage nuts 37 carried by a reinforcing plate 38, thus rigidly mounting the mounting bracket 31 upon the cowl.

As best seen in Figure 1, the forward wall 32 of the mounting bracket 31 is formed with a vertical guideway 39. The guideway 39 corresponds in width in its lower portion to the diameter of the lower end 28 of the striker member 21, and gradually increases in width in an upward direction. Adjacent the tapered guideway 39 the forward wall 32 of the mounting bracket is provided with an integral forwardly facing flange 41 reinforcing the bracket and providing a bearing surface for engagement with the lower end portion 28 of the striker member. It will be apparent that the flanged sides of the tapered guideway 39 assist in centering the striker member 21, and consequently the hood 11, as the hood is closed so that variations in the lateral position of the hood are automatically accommodated and the hood properly centered when finally closed.

A cam member 42 is provided to hold the striker member 21 in its fully closed position. The cam member 42 is pivotally mounted upon a shouldered pivot stud 43 carried by a depressed portion 44 of the forward wall 32 of the mounting bracket 31. A spring 46 is coiled around the enlarged portion 47 of the pivot stud 43, and has end portions 48 and 49 engaging respectively the adjacent side wall 33 of the mounting bracket and a tab 51 struck out from the cam member 42. The spring 46 constantly urges the cam member 42 in a counterclockwise direction about its pivot stud 43.

Figure 2:
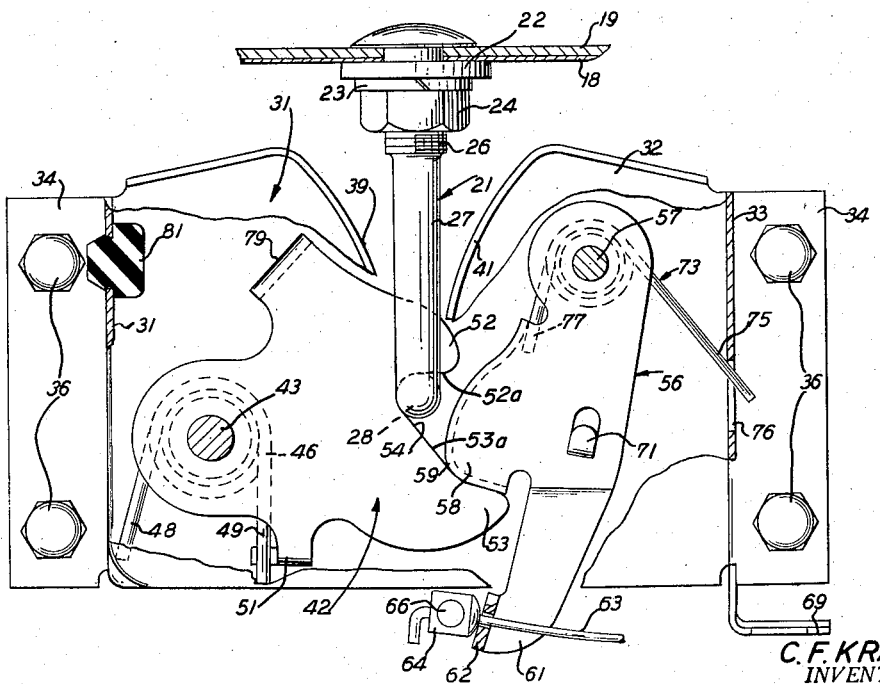
Figure 2 is a view similar to Figure 1, with the mounting plate partially broken away and in section to better illustrate the mechanism carried thereby.
Figure 5:
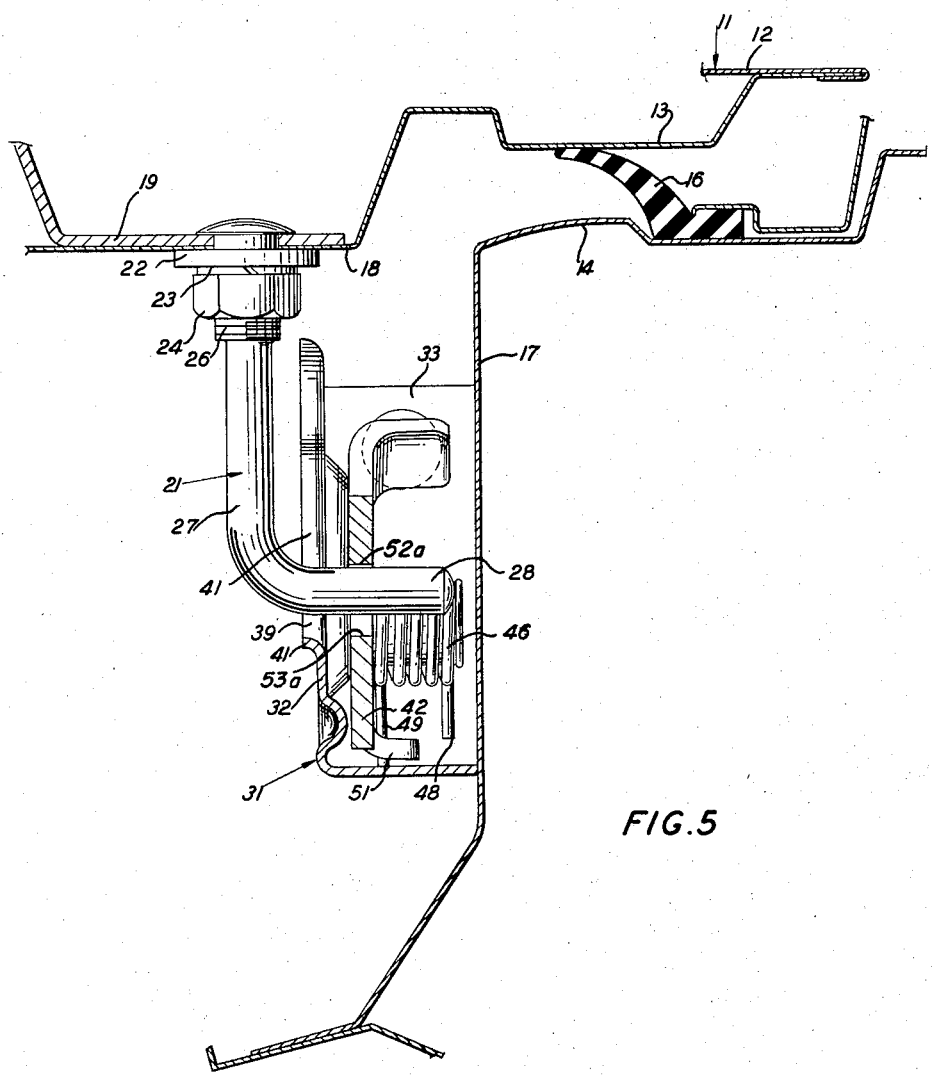
Figure 5 is a vertical cross sectional view taken on the line 5—5 of Figure 1.

The cam member 42 is formed with spaced flanges 52 and 53 forming therebetween a notch 54. In the closed position of the cam member 42, the edge 52a of flange 52 overlies the lower end 28 of the striker member 21, the flange 52 retaining the striker member in the lower portion of the guideway 39 to hold the hood 11 in its closed position. It will be noted that in the striker member 21 released position the edge 52a of the flange 52 is upwardly inclined (see Fig. 3) and in the striker member engaged position, i. e., the closed position of the cam member 42, the edge 52a is in a substantially horizontal position (see Fig. 1 or 2). The cam member 42 is held in this closed position by means of a trigger member 56 pivotally mounted upon a pivot stud 57 carried by the front wall 32 of the mounting bracket. The trigger member 56 is formed with a retaining portion 58 having a flanged edge 59 adapted to engage the flange 53 formed on the cam member 42 to block counterclockwise rotation of the cam member.

The trigger member 56 is also provided with a downwardly depending arm 61 having a flange 62 at its extremity, the latter being apertured to receive the end of a control wire 63. The extreme end of the wire 63 carries a sleeve 64 held in place upon the wire by a set screw 66 and having a semispherical nose engaging the flange 62, so that upon actuation by the wire 63 the trigger member 56 will be moved in a counterclockwise direction about its pivot stud 57 to move the retaining portion 58 thereof out of blocking engagement with the flange 53 of the cam member 42.

The control wire 63 is housed within a cable 67 held by means of a clamp 68 to a bracket 69 depending downwardly from the adjacent side wall 33 of the mounting bracket 31. The cable and wire may lead to a convenient location upon the vehicle dash for manual operation by the operator.

Intermediate its ends the trigger member 56 is formed with a struck-out tab 71 adapted to project through an opening 72 in the front wall 32 of the mounting bracket 31 to retain the trigger member from displacement longitudinally of the vehicle. A spring 73 encircles the enlarged portion 74 of the pivot stud 57 and has one end 75 projecting through an opening 76 in the side wall 33 of the mounting bracket, while the opposite end 77 engages the flange 59 at the opposite side of the trigger member 56. It will be seen that the spring 73 thus urges the trigger member 56 in a clockwise direction at all times.

In operation, the hood latch may be released by actuation of the control wire 63 to swing the trigger member 56 in a counterclockwise direction and to move the retaining portion 58 thereof out of blocking engagement with the flange 53 of the cam member 42. The cam member 42 is then rotated in a counterclockwise direction by the spring 46 and, due to the engagement between the lower end portion 28 of the striker member and the inclined wall of the notch 54 formed in the cam member, the striker member 21 and the hood to which it is attached are given an upward initial movement sufficient to enable the adjacent portion of the hood to be readily grasped by the operator and moved to a fully opened position.

Figure 3 illustrates the position of the cam member 42 after it has been released, and it will be noted that the flange 79 on the cam member is in engagement with a rubber bumper 81 carried by the side wall 33 of the mounting bracket. When the control wire 63 is released, the trigger member 56 will be automatically returned from the position shown in Figure 3 to that shown in Figure 2, and it will be apparent that the retaining flange 59 of the trigger member will then be beneath the flange 53 of the cam member 42. Upon closing movement of the hood the downward movement of the striker member 21 will first cause the lower end portion 28 thereof to engage the cam member edge 53a adjacent the upper portion of the flange 53, moving the latter in clockwise direction against the action of its spring 46. It will be noted that in the striker member 21 released position, i. e., the cam member 42 released position, the edge 53a of the flange 53 is slightly downwardly inclined, the direction of the inclination or slope of the edge 53a being such as to intersect a line drawn between the pivot centers of the cam member 42 and the trigger member 56. In operation, the lower end portion 28 of the striker 21 first engages the lowermost part or end of the edge 53a as the end portion 28 moves downwardly. As the clockwise movement of the cam member 42 takes place, the movement of the lower end portion 28 relative to the flange 53a is up the slope of the edge 53a into the pocket 54. Also, continued downward movement of the flange 53 of the cam member will cause the lower curved surface of the flange to engage the upper curved surface of the retaining flange 59 upon the trigger member 56, until the parts reach the position shown in Figure 2 in which the trigger member is again in holding relationship with respect to the cam member.

It will be understood that the invention is not to be limited to the exact construction shown and described, but that various changes and modifications may be made without departing from the spirit and scope of the invention, as defined in the appended claims.

What is claimed is:

1. In a motor vehicle having a pivotally mounted hood with a striker member depending therefrom adjacent a vertically extending body panel, a mounting plate extending vertically and parallel to said body panel, means securing said mounting plate to said panel, said mounting plate having a generally vertically extending tapered guideway formed therein with its lower portion corresponding in width to the width of the striker member and its upper portion flared outwardly to assist in centering the striker member during the closing movement of the hood, said mounting plate on one side of said guideway having a depressed portion offset from said mounting plate in the direction of said body panel, a flat cam member pivotally mounted upon said offset portion for pivotal movement in a plane parallel to said mounting plate, an elongated trigger member pivotally mounted upon said mounting plate on the opposite side of said guideway, said cam member having a pair of vertically spaced flanges at one edge, the upper edge of the lowermost of said flanges lying at a slight downwardly inclined angle across said vertical guideway in striker member released position, the direction of inclination of said upper edge intersecting a line through the pivot centers of said cam and trigger member, said striker member engaging the lower portion of said upper edge during closing movement of the hood, the lower edge of the uppermost of said flanges being upwardly inclined in striker member released position, and upon engagement by said striker member said cam member being rotated to a position in which the upper edge of the lowermost flange is further downwardly inclined and the lower edge of the uppermost flange lies in a substantially horizontal position over a portion of said striker member to hold the latter in said guideway, said trigger member having a flat body portion positioned closely adjacent said mounting plate and extending generally parallel to and laterally offset from the plane of said cam member, said trigger member having an integral extension coplanar with said flat body portion and projecting toward said cam member, said extension having a marginal flange extending at right angles to the plane of the trigger member and having a width sufficient to extend a substantial distance on each side of the plane of said cam member, said last mentioned integral flange having a lower blocking portion extending generally at right angles to the longitudinal axis of said elongated trigger member and adapted to engage the downwardly inclined upper edge of the lowermost flange of said cam member to block pivotal movement of said cam member in a direction to release said striker member, the portion of said marginal flange above said blocking portion being curved to engage the lower edge of the lowermost flange of said cam member as the hood is closed.

2. The structure defined by claim 1 which is further characterized in that said mounting plate is formed with a laterally extending slot therein in alignment with an intermediate portion of said trigger member, said trigger member having a retaining part thereon extending through said slot and terminating in a flange overlapping the adjacent edge of said mounting plate to restrain said trigger member against lateral displacement.

References Cited in the file of this patent

UNITED STATES PATENTS

| 2,381,633 | Young | Aug. 7, 1945 |
| 2,508,090 | Beems et al. | May 16, 1950 |
| 2,604,345 | Roethel | July 22, 1952 |
| 2,644,707 | Dall | July 7, 1953 |

FOREIGN PATENTS

| 868,563 | Germany | Feb. 26, 1953 |